(12) United States Patent
Newstead et al.

(10) Patent No.: US 11,407,351 B2
(45) Date of Patent: Aug. 9, 2022

(54) LOADING ARM ASSEMBLY FOR A LOAD-HANDLING VEHICLE FOR LOADING ISO CONTAINERS AND FOR LOADING TRANSPORTATION CONTAINERS HAVING A HOOK

(71) Applicant: THE DYNAMIC ENGINEERING SOLUTION PTY LTD, Holden Hill (AU)

(72) Inventors: Michael Newstead, Gawler (AU); James Browne, Woodville South (AU); Oscar Fiorinotto, Semaphore Park (AU)

(73) Assignee: THE DYNAMIC ENGINEERING SOLUTION PTY LTD, Holden Hill (AU)

( * ) Notice: Subject to any disclaimer, the term of this patent is extended or adjusted under 35 U.S.C. 154(b) by 0 days.

(21) Appl. No.: 15/734,701

(22) PCT Filed: Jun. 5, 2019

(86) PCT No.: PCT/EP2019/064646
§ 371 (c)(1),
(2) Date: Dec. 3, 2020

(87) PCT Pub. No.: WO2019/234097
PCT Pub. Date: Dec. 12, 2019

(65) Prior Publication Data
US 2021/0229587 A1    Jul. 29, 2021

(30) Foreign Application Priority Data
Jun. 6, 2018 (DE) .................... 10 2018 113 510.6

(51) Int. Cl.
*B60P 1/64* (2006.01)

(52) U.S. Cl.
CPC ................................. *B60P 1/6427* (2013.01)

(58) Field of Classification Search
CPC ....................................................... B60P 1/6427
(Continued)

(56) References Cited

U.S. PATENT DOCUMENTS 3,892,323 A * 7/1975 Corompt ............... B60P 1/6463
414/491
4,509,894 A * 4/1985 Rolfe ................... B60P 1/6427
414/555

(Continued)

FOREIGN PATENT DOCUMENTS

DE    16 80 152 A    7/1954
DE    66 09 030 U    2/1972
(Continued)

OTHER PUBLICATIONS

DE Search Report in Application No. 10 2018 113 510.6 dated Mar. 4, 2019.
(Continued)

*Primary Examiner* — Jonathan Snelting
(74) *Attorney, Agent, or Firm* — Maschoff Brennan

(57) ABSTRACT

A loading arm assembly for a load-handling vehicle has a main arm and an auxiliary arm. The loading arm assembly is configured for unloading and loading ISO containers and for unloading and loading transportation containers having a hook. The loading arm assembly is improved in that a crossbeam having two corner grippers and furthermore, separately therefrom, a telescopic gripping hook is disposed on the auxiliary arm.

20 Claims, 3 Drawing Sheets

(58) Field of Classification Search
USPC .......................................................... 414/498
See application file for complete search history.

(56) References Cited

U.S. PATENT DOCUMENTS

| | | | | |
|---|---|---|---|---|
| 5,186,598 | A | * | 2/1993 | Lambert ............... B60P 1/6463 |
| | | | | 414/498 |
| 5,743,700 | A | * | 4/1998 | Wood, Jr. ................. B60J 7/085 |
| | | | | 296/98 |
| 5,967,735 | A | * | 10/1999 | Smart ..................... B60P 1/649 |
| | | | | 193/350 |
| 6,158,947 | A | * | 12/2000 | Goiran .................. B60P 1/6463 |
| | | | | 414/491 |
| 6,705,823 | B2 | * | 3/2004 | Bohata .................... B60P 1/483 |
| | | | | 414/491 |
| 7,341,419 | B1 | * | 3/2008 | Fink ...................... B60P 1/6463 |
| | | | | 414/448 |
| 7,726,930 | B2 | * | 6/2010 | Simpson ............... B60P 1/6463 |
| | | | | 414/491 |
| 9,545,868 | B1 | * | 1/2017 | Downing .................. B66F 9/00 |
| 2007/0172342 | A1 | | 7/2007 | Zhou et al. |

FOREIGN PATENT DOCUMENTS

| | | |
|---|---|---|
| DE | 60 2004 002 468 T2 | 9/2007 |
| EP | 0155119 A2 | 9/1985 |
| EP | 0634304 A1 | 1/1995 |
| GB | 2298856 A | 9/1996 |

OTHER PUBLICATIONS

Norm ISO 668, (Aug. 1, 2013) Series 1 freight containers—Classification, dimensions and ratings. S. 1024.

* cited by examiner

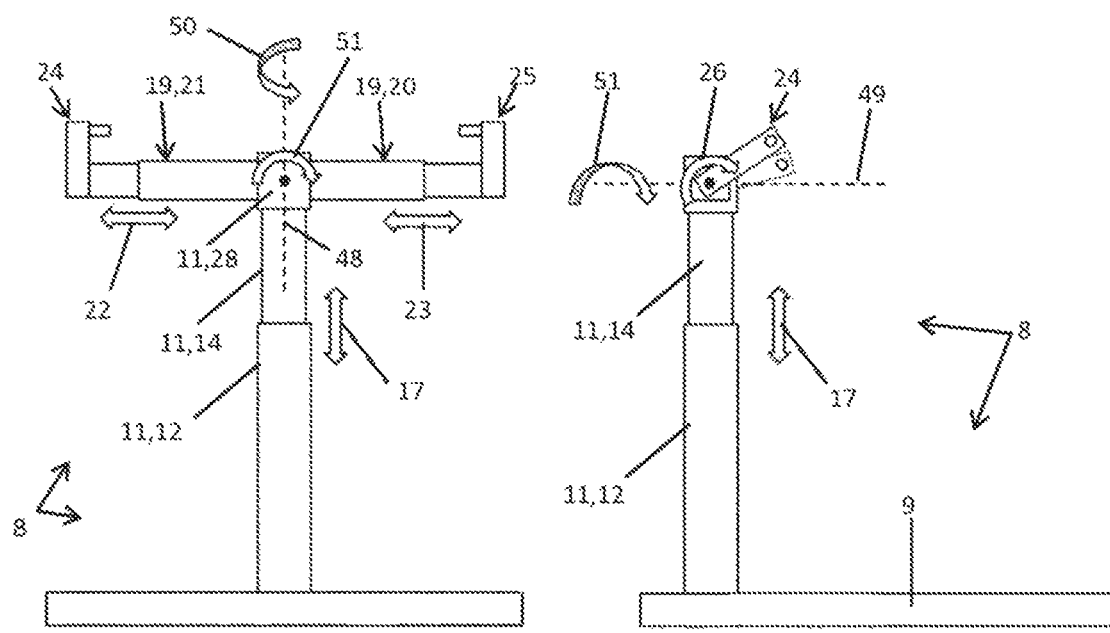

LOADING ARM ASSEMBLY FOR A LOAD-HANDLING VEHICLE FOR LOADING ISO CONTAINERS AND FOR LOADING TRANSPORTATION CONTAINERS HAVING A HOOK

The invention relates to a loading arm assembly for a load-handling vehicle, having the features of Patent Claim 1.

Load-handling vehicles are trucks which are conceived as carrier vehicles for transporting special containers. Such load-handling vehicles are also referred to as roll-on/roll-off dump trucks or hook-lift roll-on/roll-off trucks. Various roll-on/roll-off containers which can be received by a load-handling vehicle having a loading arm assembly exist.

On the one hand, there are roll-on/roll-off containers which have a hook that points obliquely upwards. In order for such transportation containers, such roll-on/roll-off flatbeds, for example, to be loaded onto the load-handling vehicle, the loading arm assembly has a corresponding gripping hook by way of which the hook of the transportation container can be gripped so as to thus pull the transportation container onto the load-handling vehicle.

On the other hand, there are loading arm assemblies which can receive a so-called ISO container. ISO standard 668 forms the respective standard for said ISO containers. Said ISO containers do not have a respective hook but are gripped by the corners. To this end, a correspondingly configured loading arm assembly has at least two corner grippers, wherein the corner grippers can grip the ISO container at the corners.

In order to now be able to load roll-on/roll-off containers of both types, that is to say having a hook and roll-on/roll-off containers in the form of ISO containers, using one load-handling vehicle, adapter solutions are known in the prior art.

A load-handling vehicle having a loading arm assembly is known from GB 2 298 856 A. The loading arm assembly has a main arm, wherein the main arm is pivotably disposed on the vehicle chassis. In turn, an auxiliary arm, configured so as to be elbow-shaped, in the form of an articulated arm is disposed on the main arm by way of an articulated joint. A gripping hook is configured on the free end of the articulated arm. An adapter having four corner grippers can be attached to the elbow-shaped region of the articulated arm, so as to thus be able to also load and unload ISO containers. The adapter when not in use can be unloaded onto the load handling vehicle behind the cab. This design embodiment has the disadvantage that the adapter has to be attached or released from the articulated arm again each time, should dissimilar roll-on/roll-off containers have to be loaded.

It has been furthermore demonstrated that gripping ISO containers is not always possible by way of four corner grippers. For example, such load-handling vehicles are also used for defence applications, wherein ISO containers or the transportation containers having hooks do not always stand on a flat solid ground but on rough terrain. There is the problem herein that the ISO containers can sink into soft ground and the lower corners of the ISO container if at all can thus only be reached with difficulty.

In such uses there is furthermore the problem that the operator of the load-handling vehicle can be exposed to danger when he/she gets out of the vehicle. It is therefore not always possible for an adapter to be used.

A load-handling vehicle having a loading arm assembly for loading ISO containers is known from EP 0 634 304 A1. The loading arm assembly herein is configured as a thrust hook. The loading arm assembly has a main arm that is pivotably fixed to the vehicle chassis, wherein an auxiliary arm, configured so as to be elbow-shaped, in the form of thrust hook arm is disposed so as to be telescopic on the main arm. The main arm is telescopic. The thrust arm is configured so as to be orthogonal to the main arm on the free arm of the latter, wherein the thrust arm is likewise configured as a telescopic arm. A crossbeam is disposed on the end of the thrust arm, wherein the corner grippers are disposed on the end of the crossbeam. The corner grippers in turn herein are disposed so as to be telescopic on the crossbeam. In order for the ISO container to now be loaded, the load-handling vehicle is first positioned, ideally so as to be aligned with the container. Thereafter, the position of the corner grippers relative to the upper corners of the container can be positioned by pivoting and telescoping the main arm, by telescoping the thrust arm, and by telescoping the crossbeam having the grippers. It is now no longer necessary for the lower corners but only for the upper corners of the ISO container to be gripped, the latter being more readily accessible. It has been demonstrated that even this design embodiment is not yet configured in an optimal manner. The loading of the ISO container is still possible only with difficulty when the ISO container stands on soft ground and partially sinks thereinto, wherein the container stands so as to be tilted about its longitudinal axis in relation to the load-handling vehicle, or the load-handling vehicle cannot be positioned so as to be exactly aligned with the container.

The invention is therefore based on the object of improving the generic loading arm assembly and a respective load-handling vehicle having such a loading arm assembly.

This object on which the invention is based now is achieved by a loading arm assembly having the features of independent Patent Claim 1. Accordingly, in the case of a loading arm assembly for a load-handling vehicle, having a main arm and an auxiliary arm, wherein the loading arm assembly is configured for unloading and loading ISO containers and for unloading and loading transportation containers having a hook, a solution to the object according to the invention is present when a crossbeam having two corner grippers and furthermore, separately therefrom, a telescopic gripping hook is disposed on the auxiliary arm.

The auxiliary arm preferably has two outer sleeves, wherein the outer sleeves form a functional unit that is fastened to the main arm, wherein a first internal part having the crossbeam and the respective corner grippers for gripping ISO containers is guided in the first outer sleeve, and a second internal part is guided in the second outer sleeve, wherein a gripping hook is disposed on said second internal part. The second outer sleeve and the second inner sleeve are likewise telescopic. This design embodiment has the advantage that an adapter can be dispensed with. Transportation containers having a hook as well as ISO containers can be unloaded from the load-handling vehicle or loaded onto the load-handling vehicle by way of this loading arm assembly.

The crossbeam is pivotable relative to the auxiliary arm about two axes. The drive herein can be performed in a motorized, a pneumatic, or in particular a hydraulic manner. The crossbeam is pivotable about the longitudinal axis of the auxiliary arm, on the one hand. On account thereof, an angular offset between the load-handling vehicle and the roll-on/roll-off container can be compensated for. When the roll-on/roll-off container does not stand so as to be exactly aligned with the load-handling vehicle but is at a slight angular offset, the crossbeam can thus be rotated about the longitudinal axis of the arm region of the auxiliary arm that is connected to said crossbeam, on account of which the corner grippers can be securely attached to the upper corners of the ISO container. The pivoting capability can be, for example, more than 5 degrees, in particular more than 10 degrees.

Furthermore, the crossbeam is pivotable about an axis, the so-called transverse axis, that runs so as to be transverse relative to the crossbeam and to the arm region that is connected to the latter, such that containers which have laterally sunken into the ground can also be securely gripped. On account thereof, the container stands so as to be slightly tilted about its longitudinal axis. This tilted position can be compensated for by rotating the crossbeam about the transverse axis.

This design embodiment furthermore has the advantage that, on account of the setting capability of the position of the crossbeam having the two corner grippers, it is no longer necessary for the operator to leave the cab. This has advantages in particular in defence applications since the operator is protected on account thereof.

The load-handling vehicle is in particular configured as a defence vehicle. It is conceivable for the cab to have armour.

The crossbeam and the arm region of the auxiliary arm that is connected to the former are mutually disposed in a T-shaped manner. A joint between the crossbeam and the connected arm region is in particular configured as a universal joint. The universal joint has a crosspiece, wherein the crosspiece has two axle stump pairs that cross in an orthogonal manner. The one axle stump pair herein in the initial position points substantially in the direction of the auxiliary arm. The crossbeam is disposed on said axle stump pair so as to be rotatable about the longitudinal axis of the auxiliary arm. The other axle stump pair in the initial position is disposed so as to be perpendicular to the connected arm region of the auxiliary arm and to the crossbeam, and thus enables the movement about the transverse axis.

One axle stump pair is rotatably disposed on the auxiliary arm, and the other axle stump pair is rotatably disposed on the crossbeam.

A housing is disposed on the end of the free auxiliary arm, wherein the axle stump pair that extends along the transverse axis is preferably disposed, in particular mounted, so as to be rotatable in two receptacles of the housing. The crossbeam herein engages through the housing. The housing on the upper side thereof has an assembly opening, and on the front side and the rear side in each case likewise one assembly opening, wherein said two assembly openings serve as receptacles for the axle stump pair that is oriented in the transverse direction. Bearing shells can be inserted in the assembly openings, wherein heads of the assigned axle stump pair are rotatably disposed in the bearing shells.

The crosspiece is configured so as to be capable of being taken apart for assembly purposes. The crosspiece has the total of four axle stumps and a centre piece to which the axle stumps can be fastened. The centre piece and the axle stumps are in particular interconnectable by a screw connection.

In order for an optimal positioning capability of the corner grippers and/or of the gripper hook to be achieved, the main arm is configured so as to be telescopic, and the auxiliary arm is likewise configured so as to be telescopic. The crossbeam has two crossbeam regions, wherein each of the two crossbeam regions are configured so as to be telescopic. The corner grippers are furthermore pivotable about the longitudinal axis of the crossbeam.

In order for the corner grippers, or the hook, respectively, now to be able to be positioned precisely relative to the roll-on/roll-off container, the load-handling vehicle has in particular a sensor system having at least one preferably optical sensor. The position of the roll-on/roll-off container relative to the load-handling vehicle can be detected by way of said sensor system. A determination of the position of the corners or of the hook, respectively, of the roll-on/roll-off container is in particular possible by means of the sensor system. It is conceivable for the load-handling vehicle to have an automated control system for loading and unloading the roll-on/roll-off containers. To this end, the position of the roll-on/roll-off container, and in particular of the upper corners in the case of an ISO container, or of the hook in the case of a transportation container having a hook, is first determined by means of the sensor system. Proceeding therefrom, the loading arm assembly is actuated in a fully automatic or partially automatic manner such that the corner grippers, or the gripping hook, respectively, can grip the roll-on/roll-off container in a corresponding manner.

A display which displays a camera image or a virtually rendered image of the container and of the loading arm assembly to the operator can be disposed within the cab. It is possible for a pair of VR glasses (virtual reality glasses) to serve as a display. The display facilitates controlling and/or managing the loading procedure for the operator.

Once the roll-on/roll-off container has been pulled onto the load-handling vehicle, the roll-on/roll-off container on the latter is secured automatically by means of a twist-lock system.

The disadvantages mentioned at the outset are therefore avoided, and corresponding advantages are achieved.

There are now a multiplicity of possibilities in terms of design embodiments and refinements of the invention. To this end, reference may first be made to the patent claims dependent on Patent Claim 1. A preferred design embodiment of the invention will be explained in more detail hereunder by means of the drawing and of the associated description.

In the drawing:

FIG. 4 shows the loading arm assembly without the gripping hook, in a schematic rear view;

FIG. 5 shows the loading arm assembly according to FIG. 4, in a schematic lateral view.

Figure 1:
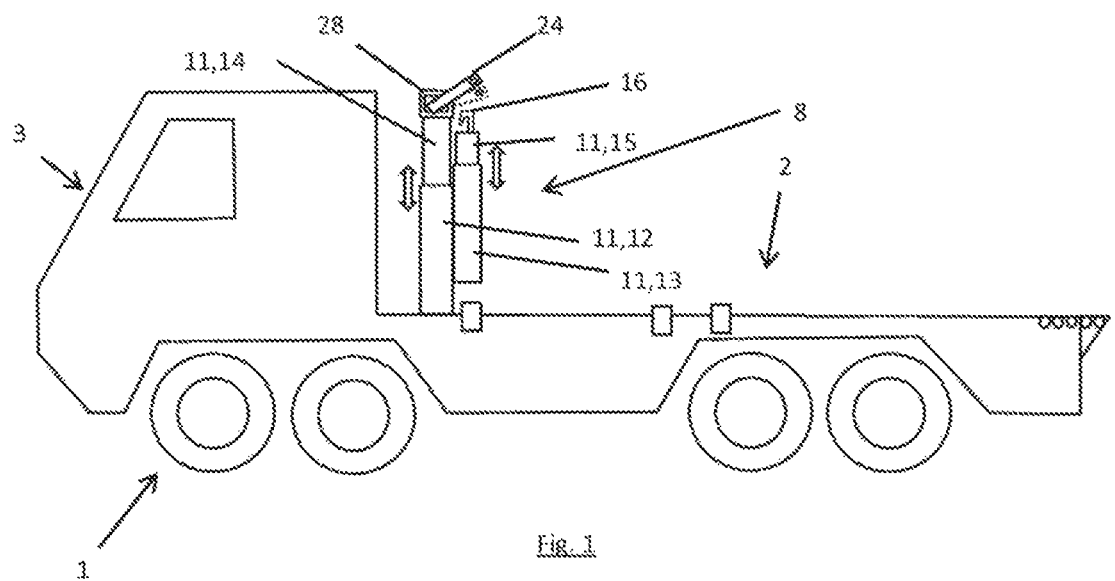
FIG. 1 shows a load-handling vehicle having a loading arm assembly in an initial position, in a schematic lateral view.
Figure 2:
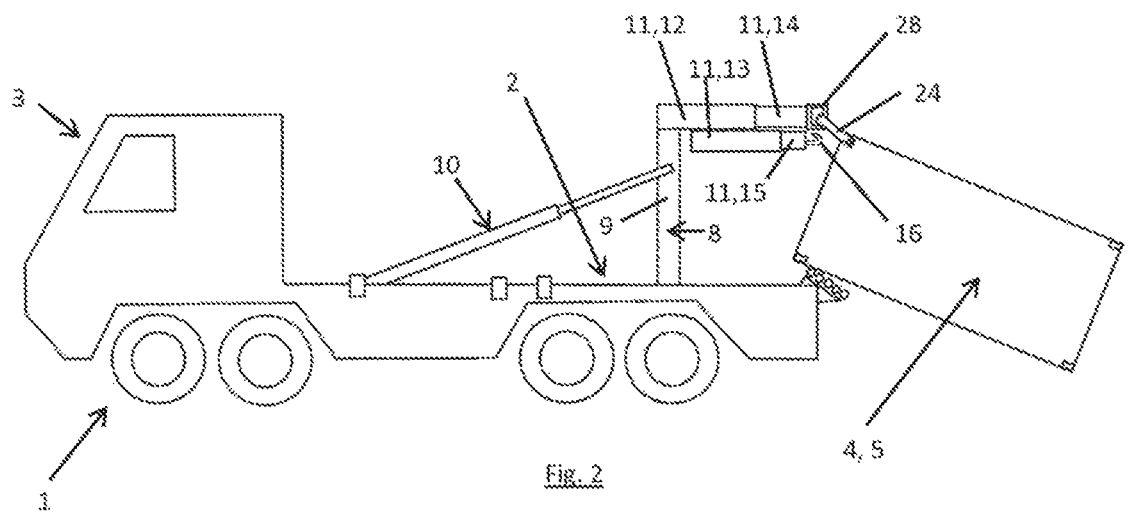
FIG. 2 shows the load-handling vehicle having the loading arm assembly in a deployed position when loading an ISO container, in a schematic lateral view.
Figure 3:
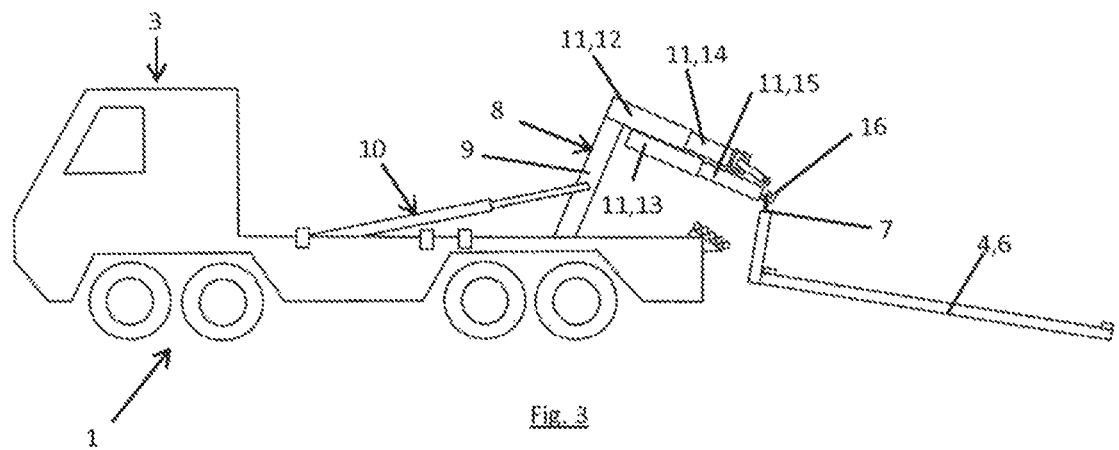
FIG. 3 shows the load-handling vehicle when loading a roll-on/roll-off flatbed which is gripped by the loading arm assembly by means of a gripping hook, in a schematic lateral view.

A load-handling vehicle 1 can be readily seen in FIGS. 1 to 3. The load-handling vehicle 1 has a truck bed 2 and a cab 3. The load-handling vehicle 1 is configured in particular for defence applications. To this end, the cab 3 can be configured so as to be armoured, for example. The load-handling vehicle 1 is in particular suitable not only for on-road use but also for off-road use.

By way of the load-handling vehicle 1, dissimilar roll-on/roll-off containers 4 such as, for example, an ISO container 5 or a transportation container 6 having a hook 7 can now be loaded. To this end, the load-handling vehicle 1 has a loading arm assembly 8 which is suitable for loading ISO containers 5 as well as transportation containers 6 having a hook 7.

The loading arm assembly 8 has a main arm 9, wherein the main arm 9 by way of one end thereof is pivotably articulated on the truck bed 2, in particular on a vehicle chassis or the like. A drive, in particular in the form of a hydraulically activated thrust bar 10, is present in order for the main arm 9 to be pivoted. Alternatively, a pneumatic or motorized drive can be provided. The main arm 9 in the longitudinal direction thereof is configured in particular so as to be telescopic so as to be able to receive roll-on/roll-off containers 4 of dissimilar lengths. An auxiliary arm 11 is disposed on the other end of the telescopic part of the main arm 9, wherein the auxiliary arm 11 extends so as to be substantially perpendicular to the main arm 9. The auxiliary arm 11 herein is fastened to the main arm at a fixed angle. The auxiliary arm 11 is in particular fastened to a telescopic part of the main arm 9. This design embodiment can also be referred to as a thrust hook. The auxiliary arm 11 can also be referred to as a thrust arm. It is possible for the auxiliary arm 11 to be configured as an articulated arm and to be pivotably disposed on the main arm 9 (not illustrated).

The auxiliary arm 11 now has two gripper systems. On the one hand, a gripper system for gripping ISO containers 5 is present, and a gripper system for gripping transportation containers 6 having a hook 7 is present, on the other hand. An adapter can be dispensed with on account thereof.

The auxiliary arm 11 here has two outer sleeves 12, 13 in which in each case one displaceable internal part 14, 15 is disposed in a telescopic manner. A gripping hook 16 is disposed on the end of the second internal part 15. The gripping hook 16 is thus likewise telescopic in the transverse direction relative to the main arm.

The other gripper system for gripping ISO containers will be explained in more detail hereunder by means of FIGS. 4 and 5.

The telescopic capability of the auxiliary arm 11 is indicated by the arrow 17 in FIGS. 4 and 5. A crossbeam 19 is disposed on the free end of the first internal part 14. The crossbeam 19 herein, substantially by way of the centre thereof, is disposed on the end of the first internal part 14. The crossbeam 19 has a first crossbeam region 20 and a second crossbeam region 21, each in FIG. 4 laterally protruding in the longitudinal direction of the crossbeam to the left and the right beyond the internal part 14. Each of the two crossbeam regions 20, 21 is configured so as to be telescopic. The telescopic capability is indicated by the arrows 22, 23. Corner grippers 24, 25 which are in each case pivotable about the longitudinal axis of the crossbeam 19, this being indicated by the arrow 26, are disposed on the free ends of the crossbeam regions 20, 21. The respective movements of the crossbeam regions 20, 21, or of the corner grippers 24, 25, respectively, are performed in a hydraulic, pneumatic, or motorized manner.

Figure 6:
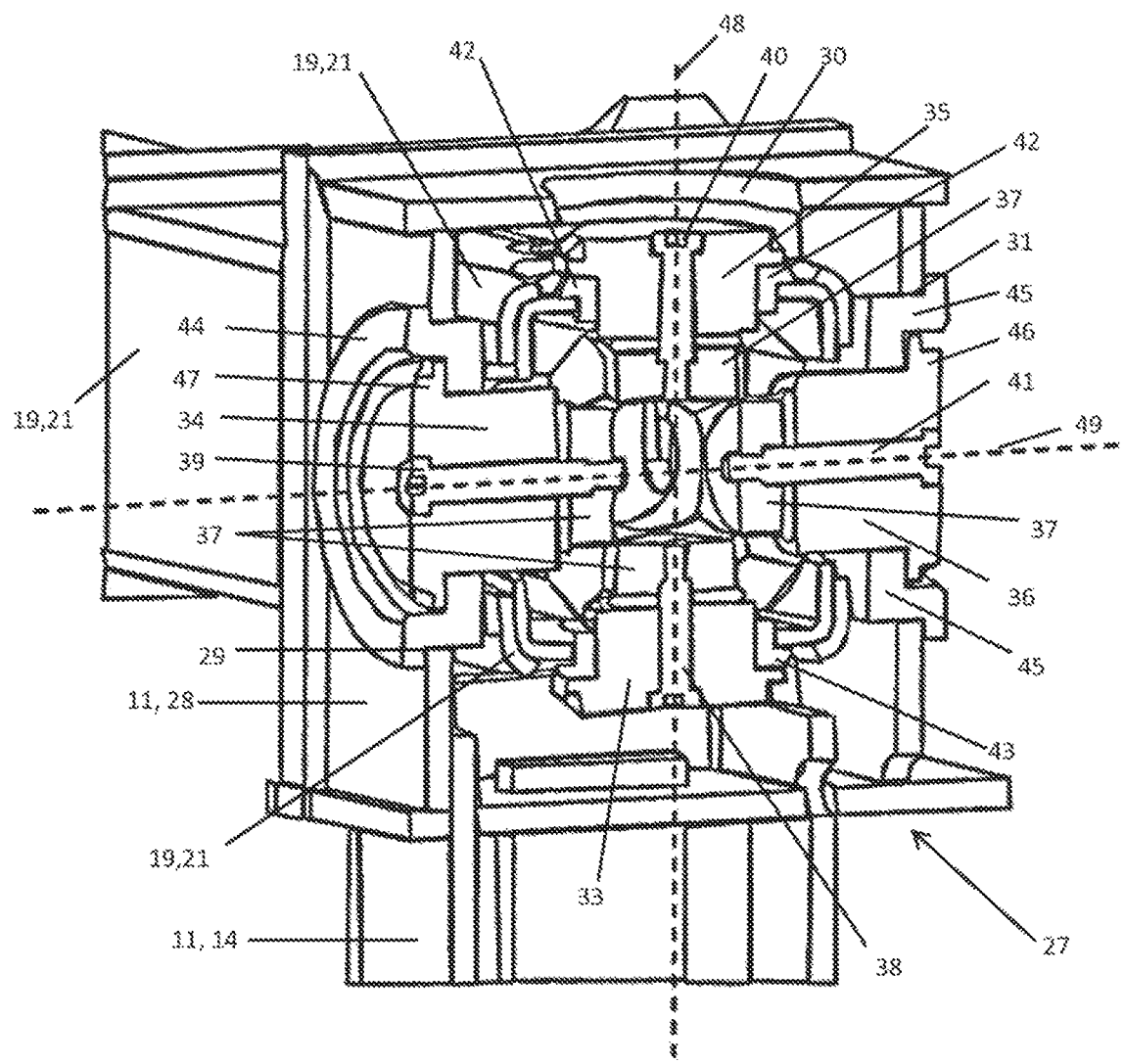
FIG. 6 shows a universal joint of the loading arm assembly, in a schematic sectional illustration, said universal joint rotatably connecting a crossbeam and an auxiliary arm.

It is a particular advantage of the loading arm assembly 8 that the crossbeam 19 is pivotable about two axes relative to the auxiliary arm 11, specifically relative to the internal part 14 here. This is achieved in that the crossbeam 19 is connected to the internal part 14 by way of a universal joint 27 (cf. FIG. 6). In an alternative design embodiment, a ball joint (not illustrated) can be used instead of a universal joint 27, for example.

A housing 28 is disposed on the end of the internal part 14, wherein the universal joint 27 is disposed within the housing 28. The housing 28 has three assembly openings 29, 30, 31. The assembly openings 29 and 31 herein are disposed on the front and the rear side (not referred to in more detail) of the housing 28, and the assembly opening 30 is disposed on the upper side. Furthermore, the housing 28 has in each case two engagement openings such that the crossbeam 19 can engage through the housing 28.

The universal joint 27 has a crosspiece 32, wherein the crosspiece 32 is formed by four axle stumps 33, 34, 35, 36 and a central piece 37. The two axle stumps 33 and 35, and the two axle stumps 34 and 36, are in each case disposed so as to be mutually aligned. On account thereof, two axle stump pairs 33, 35, and 34, 36, respectively, that cross in an orthogonal manner are formed. The axle stumps 33, 34, 35, 36 are connected to a central piece 37. The axle stumps 33 to 36 are in particular connected to the central piece 37 by a screw connection 38, 39, 40, 41. The axle stumps 33 and 35 by way of a bearing shell 42, 43 are disposed so as to be pivotable relative to the crossbeam 19. Respective bearing shells 44, 45 are disposed in the assembly openings 29, 31, wherein the bearing shells 44, 45 by way of in each case one collar (not referred to in more detail) bear externally on the housing 28. The bearing shells 44, 45 herein form a stepped receptacle in which the heads 46, 47 are disposed. The heads 46, 47 herein have a larger diameter than the bore of the bearing shells 42 to 45.

On account thereof, the crossbeam 19 is pivotable about the longitudinal axis 48 of the auxiliary arm 11 as well as about a transverse axis 49. The transverse axis 49 herein extends so as to be transverse to the auxiliary arm 11 as well as transverse to the crossbeam 19. The longitudinal axis 48 and the transverse axis 49 are mutually orthogonal.

Pivoting the crossbeam 19 about the longitudinal axis 48 enables a compensation when the load-handling vehicle 1 and the roll-on/roll-off container 4 in the form of the ISO container 5 are at an angle and are not mutually aligned. Pivoting the crossbeam 19 about the transverse axis 49 enables a compensation when the ISO container is tilted about its longitudinal axis because it has sunken into soft ground, for example.

On account of this potential pivoting capability of the crossbeam 19 about the longitudinal axis 48 (cf. arrow 50, FIG. 4) and the transverse axis 49 (cf. arrow 51, FIGS. 4 and 5), the ISO container 5 can be securely received by the loading arm assembly 8 even in difficult environmental conditions, for example in the off-road use of respective ISO containers 5.

A particular advantage of this loading arm assembly 8 lies in that it is possible for the ISO containers 5 and/or the transportation containers 6 to be fully automatically loaded and unloaded by way of the corresponding hook 7.

It is neither necessary for an adapter for modifying ISO containers 5 to a gripping hook system to have to be manually used, nor is it necessary for the load-handling vehicle 1 to have to be aligned precisely with the ISO container 5, or for the ISO container to have to be at the same angle as the load-handling vehicle 1.

The disadvantages mentioned at the outset are thus avoided and corresponding advantages are achieved.

LIST OF REFERENCE SIGNS

1 Load-handling vehicle
2 Truck bed
3 Cab
4 Roll-on/roll-off container
5 ISO container
6 Transportation container/Roll-on/roll-off flatbed
7 Hook
8 Loading arm assembly
9 Main arm
10 Thrust bar 11 Auxiliary arm
12 Outer sleeve
13 Outer sleeve
14 Internal part
15 Internal part
16 Gripping hook
17 Arrow
18 Arrow
19 Crossbeam
20 Crossbeam region
21 Crossbeam region
22 Arrow
23 Arrow
24 Corner gripper
25 Corner gripper
26 Arrow
27 Universal joint
28 Housing
29 Assembly opening
30 Assembly opening
31 Assembly opening
32 Crosspiece
33 Axle stump
34 Axle stump
35 Axle stump
36 Axle stump
37 Central piece
38 Screw connection
39 Screw connection
40 Screw connection
41 Screw connection
42 Bearing shell
43 Bearing shell
44 Bearing shell
45 Bearing shell
46 Head of the axle stump
47 Head of the axle stump
48 Longitudinal axis
49 Transverse axis
50 Arrow
51 Arrow

The invention claimed is:

1. A loading arm assembly for a load-handling vehicle configured for unloading and loading of ISO containers and transportation containers having a hook, the loading arm assembly comprising:
a main arm,
an auxiliary arm connected with respect to the main arm,
a crossbeam, connected with respect to the auxiliary arm, comprising two corner grippers, and
a telescoping gripping hook connected with respect to the auxiliary arm, wherein:
the telescoping gripping hook is telescopically moveable relative to the crossbeam and corner grippers between a retracted position and a deployed position, such that when the telescoping gripping hook is in the retracted position, the loading arm assembly is configured for unloading and loading of ISO containers via the two corner grippers, and when the telescoping gripping hook is in its deployed position, the loading arm assembly is configured for unloading and loading of transportation containers having a hook.

2. The loading arm assembly according to claim 1, wherein:
the auxiliary arm comprises first and second outer sleeves and first and second internal parts,
the first and second outer sleeves form a functional unit that is fastened to the main arm,
the crossbeam and the respective corner grippers for gripping ISO containers are disposed on the first internal part that is guided in the first outer sleeve, and
the gripping hook is disposed on the second internal part that is guided in the second outer sleeve.

3. The loading arm assembly according to claim 1, wherein the crossbeam is pivotable relative to the auxiliary arm about two axes.

4. The loading arm assembly according to claim 3, wherein:
the crossbeam is pivotable about a transverse axis,
the transverse axis extends perpendicularly to a longitudinal axis of the crossbeam and perpendicularly to a longitudinal axis of the auxiliary arm, and
wherein the crossbeam is pivotable about the longitudinal axis of the auxiliary arm.

5. The loading arm assembly according to claim 3, wherein:
the crossbeam and the auxiliary arm are connected by way of a universal joint,
the universal joint has a crosspiece comprising two axle stump pairs,
the auxiliary arm is rotatably connected to one axis stump pair, and
the crossbeam is rotatably connected to the other axle stump pair.

6. The loading arm assembly according to claim 3, wherein:
the auxiliary arm comprises a housing,
the crossbeam engages through the housing, and
one axle stump pair is rotatably disposed on the housing.

7. The loading arm assembly according to claim 6, wherein:
the axle stump pair that rotatably engages on the housing extends perpendicularly to the crossbeam and perpendicularly to a longitudinal direction of the auxiliary arm.

8. The loading arm assembly according to claim 1, wherein the main arm is configured so as to be telescopic.

9. The loading arm assembly according to claim 1, wherein the auxiliary arm is configured as to be telescopic.

10. The loading arm assembly according to claim 1, wherein:
the crossbeam comprises two crossbeam regions, and
each of the two crossbeam regions is configured so as to be telescopic.

11. The loading arm assembly according to claim 1, wherein the corner grippers are pivotable about a longitudinal axis of the crossbeam.

12. A load-handling vehicle comprising a loading arm assembly according to claim 1.

13. A load-handling vehicle comprising a loading arm assembly according to claim 2.

14. A load-handling vehicle comprising a loading arm assembly according to claim 3.

15. A load-handling vehicle comprising a loading arm assembly according to claim 4.

16. A load-handling vehicle comprising a loading arm assembly according to claim 5.

17. A load-handling vehicle comprising a loading arm assembly according to claim 6.

18. A load-handling vehicle comprising a loading arm assembly according to claim 7.

19. A load-handling vehicle comprising a loading arm assembly according to claim 8.

20. A load-handling vehicle comprising a loading arm assembly according to claim 9.

* * * * *